United States Patent [19]

Lasecki et al.

[11] Patent Number: 5,033,864

[45] Date of Patent: Jul. 23, 1991

[54] TEMPERATURE SENSING PACIFIER WITH RADIO TRANSMITTER AND RECEIVER

[76] Inventors: Marie R. Lasecki, 2596 Front St., Slidell, La. 70458-3998; Robert N. Montgomery, 109 Brownlee, Broussard, La. 70518; Samir Berjaoui, 416 Mountain Ave., Apt. 21, P.O. Box 41464, Lafayette, La. 70504

[21] Appl. No.: 404,615

[22] Filed: Sep. 8, 1989

[51] Int. Cl.[5] .......................... G01K 1/14; A61J 17/00

[52] U.S. Cl. .................................... 374/151; 128/736; 606/234

[58] Field of Search ................ 374/163, 151; 455/100; 340/539; 606/234

[56] References Cited

U.S. PATENT DOCUMENTS

| | | | |
|---|---|---|---|
| 3,916,312 | 10/1975 | Campbell | 455/100 |
| 4,554,919 | 11/1985 | Hubert | 606/234 |
| 4,747,413 | 5/1988 | Bloch | 374/163 |
| 4,857,030 | 8/1989 | Rose | 340/539 X |

FOREIGN PATENT DOCUMENTS

| | | | |
|---|---|---|---|
| 0039434 | 4/1981 | Japan | 374/151 |

OTHER PUBLICATIONS

Publication: "Electronics", Jan. 3, 1958, pp. 86–87, *Radio Thermometer Fits in Egg,* and *Miniaturization* article.

Publication: "Electronic Design", 24, Nov. 22, 1978, pp. 160–163, *Tired of Just Reading Results? Let Your Instrument Do the Talking.*

*Primary Examiner*—Daniel M. Yasich

*Attorney, Agent, or Firm*—Pravel, Gambrell, Hewitt, Kimball & Krieger

[57] ABSTRACT

An apparatus for checking and monitoring a child's temperature through the use of a baby pacifier. The pacifier provides a radio signal to a receiver unit. The pacifier senses the temperature and provides a proportional frequency signal if above or below designed limits. The pacifier detects temperature variation, discriminates between normal or abnormal temperatures and automatically transmits only the abnormal high/low temperature signals to a remote radio receiving apparatus where such signals are visually displayed and audible/visual alarms are provided.

14 Claims, 4 Drawing Sheets

TEMPERATURE SENSING PACIFIER WITH RADIO TRANSMITTER AND RECEIVER

BACKGROUND OF THE INVENTION

1. Field of the Invention

The apparatus of the present invention relates to infant pacifiers. More particularly, the present invention relates to infant pacifiers that utilizes the oral method for sensing body temperature of a baby.

2. General Background

Parents are always concerned with the health of their children and especially infants. Infants and young children are very susceptible to infections that could lead to severe problems. Since children at very young ages can not tell the parent when and why they do not feel well, parents and medical personnel relay on temperature monitoring as an early warning indicator.

Children are very uncooperative when it comes to taking their temperature with a thermometer. Various methods have been used to check the child's temperature such as rectal and at the arm pit. If the child is sick, these methods cause additional discomfort and must be performed repeatedly to monitor the child's reaction to medication.

In the past a more comfortable method has been sought to take the child's temperature and to monitor the temperature over an extended period of time. One such method is taught by U.S. Pat. No. 3,913,402 describing the use of a glass mercury thermometer mounted in a baby nipple pacifier. This device, though effective in taking a child's temperature orally, has some drawbacks, such as making the pacifier somewhat ridged and even though the inventor indicates that a child can not break the glass thermometer, parents may have some doubts. Also, the temperature must be taken by reading the thermometer while it is still in the child's mouth or be removed for reading and shaken to reset. If the child is asleep this procedure may awaken them.

An alternative means is disclosed in U.S. Pat. No. 4,447,164 wherein a temperature responsive pacifier utilizes a clear glycerine liquid and a glycerine, combined with gelatin and sorbitol to form a capsule encapsulated in the pacifier nipple which produces a color change when a temperature of approximately 100 degrees is detected. Pacifiers of this type although more pliable, still must be removed from the mouth periodically to detect the color change and it only serves as an approximation of temperature. A thermometer must still be used to get an accurate reading.

The latest technology using the electronic clinical thermometer inserted in a pacifier has also been marketed. While this allows simpler, quicker readings, most of the same drawbacks discussed above still occur.

Thus the ideal method of checking a child's temperature would be to utilize the child's natural inclination to nurse by substituting a very pliable nipple pacifier, containing a temperature sensing means that can be remotely monitored on a continuous basis. The device would also need to be capable of giving an alarm when an abnormal temperature is detected or when the temperature continues to rise beyond an adjustable selected range. Such a device should also provide a abnormal indication when the pacifier has returned to ambient temperature indicating the pacifier is no longer in the child's mouth.

SUMMARY OF THE PRESENT INVENTION

The apparatus of the present invention relates to an ideal method for checking and monitoring a child's temperature through the use of a baby pacifier. What is provided is a pacifier having temperature sensing thermistors embedded internally in the pacifier nipple and connected to a simple miniature low wattage FM radio transmitter mounted on the exterior face of the pacifier flange. An antenna is molded into the pacifier pull ring. A battery power supply is provided on the pacifier with an interchangeable cartridge.

The miniature battery-powered transmitter is supported with an internal automatic power-down feature to save on battery life. The transmission is kept OFF as long as the measured body temperature is within the normal range; however, when the measured temperature passes out of the specified range, the transmission is automatically turned ON. The transmission will remain ON as long as an abnormally high body temperature is present. An additional design feature is whenever the measured temperature gets below normal body temperature the transmission is designed to stray ON only for a short period of time so as to warn the receiver of an abnormal condition, signified by a repetitive beep at a fixed slow rate. This usually occurs when the child no longer has the pacifier in its mouth. The transmitter will resume transmission when the pacifier again senses an abnormal high body temperature.

A switch means may also be incorporated in the transmitter circuit to disable the transmitter or to verify normal temperature reading prior to normal monitoring on a continuous basis.

A remote AC/DC powered FM radio receiver is also provided to monitor the transmission signal produced by the pacifier transmitter. The FM receiver is provided with a carrier field strength meter, providing a visual indication of transmission strength and battery condition at any given time. A low meter reading may indicate the transmitter is outside the prescribed range or early warning of battery failure. The receiver is provided with an audible signal means, indicating an abnormal condition, e.g. a slow beep rate signifying an abnormal low temperature or a fast beep rate signifying the need to change the battery in the transmitter. The receiver is also provided with a 4-digit decimal switch, which can be manually set at a temperature above the normal body temperature, above which the audible alarm will sound. The receiver is equipped with a 4-digit, digital display and a power ON/OFF switch. The display is updated by periodic signals being generated from the transmitter, providing an accurate and easily readable display of the child's temperature even while sleeping. A third type audible signal signified by a continuous intermediate beep is an indication of an abnormal temperature above the limit set by the user. A visual alarm light is also provided to indicate an above normal body temperature regardless of temperature set point.

Therefore, the principle object of the present invention is to provide a wireless temperature sensing baby pacifier capable of transmitting a unique temperature signal by radio wave over a short range to a radio receiver and visually displaying and monitoring child's body temperature.

A further principle object of the present invention is to provide an audible and visual alarm for abnormal body temperatures.

Another object of the present invention is to provide a set point means for the audible alarm.

It is still a further object of the present invention to provide a large digital temperature display monitor.

BRIEF DESCRIPTION OF THE DRAWINGS

For a further understanding of the nature of the present invention, reference should be made to the following detailed description, taken in conjunction with the accompanying drawings, in which like parts are given like reference numerals, and wherein.

DETAILED DESCRIPTION OF THE PREFERRED EMBODIMENT

Figure 1:
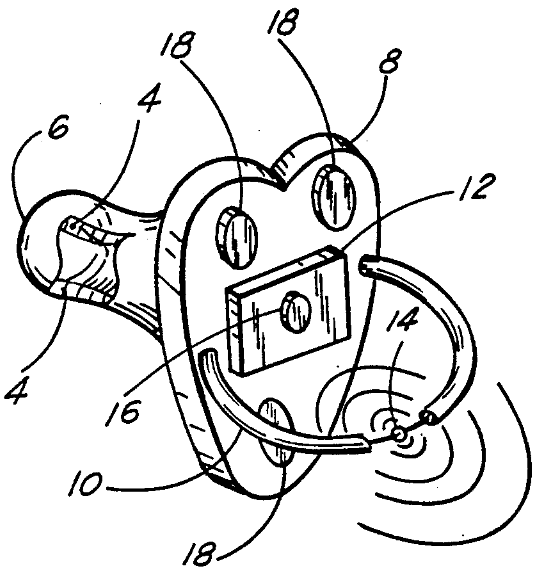
FIG. 1 is an isometric view of the preferred embodiment of a baby pacifier, showing the transmitter, batteries, antenna, a cut away section view revealing the thermistors and the associated receiving means.
Figure 1A:
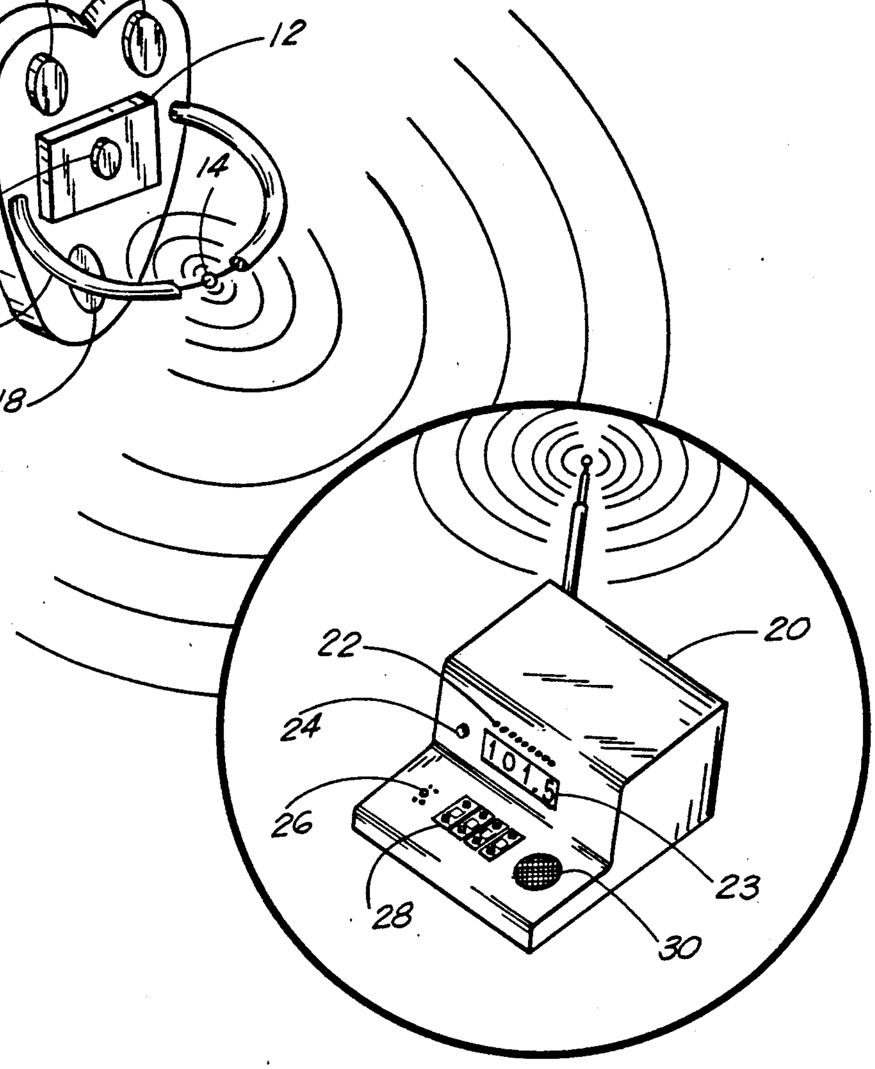
FIG. 1A is an isometric view of the FM receiver.
Figure 2A:
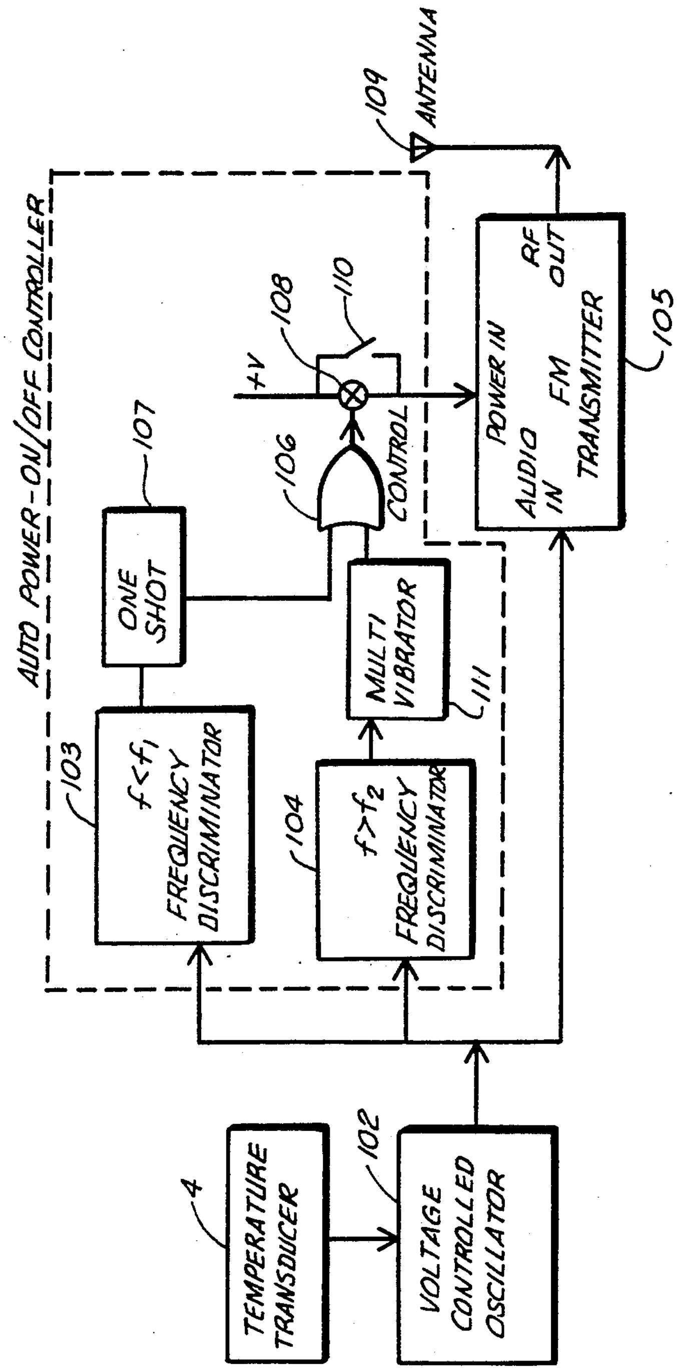
FIG. 2A is a block diagram of a circuit for sensing body temperature coupled to a frequency transmitter.
Figure 2B:
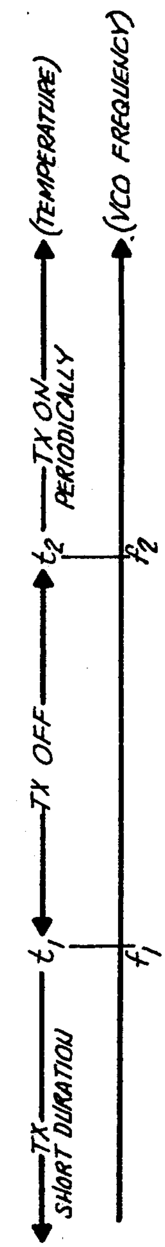
FIG. 2B is a frequency, temperature line diagram illustrating automatic transmission cycles for a preset temperature tolerance range.

Embodiments of the present invention will now be described with reference to the accompanying drawings:

FIG. 1 is a structural view of a temperature measuring device in the form of a baby pacifier. The pacifier having a battery powered FM transmitter 12 mounted thereon and battery modules 18 mounted in close proximity. The baby's body temperature is sensed through the nipple portion 6, by temperature transducers 4 producing a voltage variation. The bead thermistor transducers 4 are connected to the voltage controlled oscillator 102 located in the transmitter pack 12, and positioned on the external face of mouth flange 8. There the voltage variations are converted to frequency variations. The oscillated tones are then fed to frequency discriminators 103, 104 and to the audio input of FM transmitter 12. Frequency discriminator 103 detects tones less than the preset temperature tolerance as indicated by T1 in FIG. 2B and frequency discriminator 104 detects tones greater than the preset temperature tolerance as indicated by T2 in FIG. 2B. A logic low signal from frequency discriminator 103 is fed into one shot 107. Here a single pulse having a preset duration is sent to OR gate 106 activating control switch 108. The control switch in turn activates the transmitter 105 only for a short duration in order to conserve battery 18 power when temperatures below the normal body temperatures are detected as illustrated in diagram at T1. When a logic high signal from frequency discriminator 104 is detected by multi-vibrator 111 an intermittent pulse is sent through OR gate 106 to control switch 108 turning transmitter 105 on and off on a periodic basis as shown by T2 in FIG. 2B. This conserves battery power while still updating the digital display 23 at the receiver unit 20. An auto power-down bypass test switch 16 is provided as a means of testing the transmitter pack 12. When switch 110 is closed any temperature sensed by transducer 4 is processed through transmitter pack 12 where the signal is transmitted via antenna 14 embedded in pacifier ring 10 to receiving means 20 and displayed digitally by temperature readouts 23.

Figure 3:
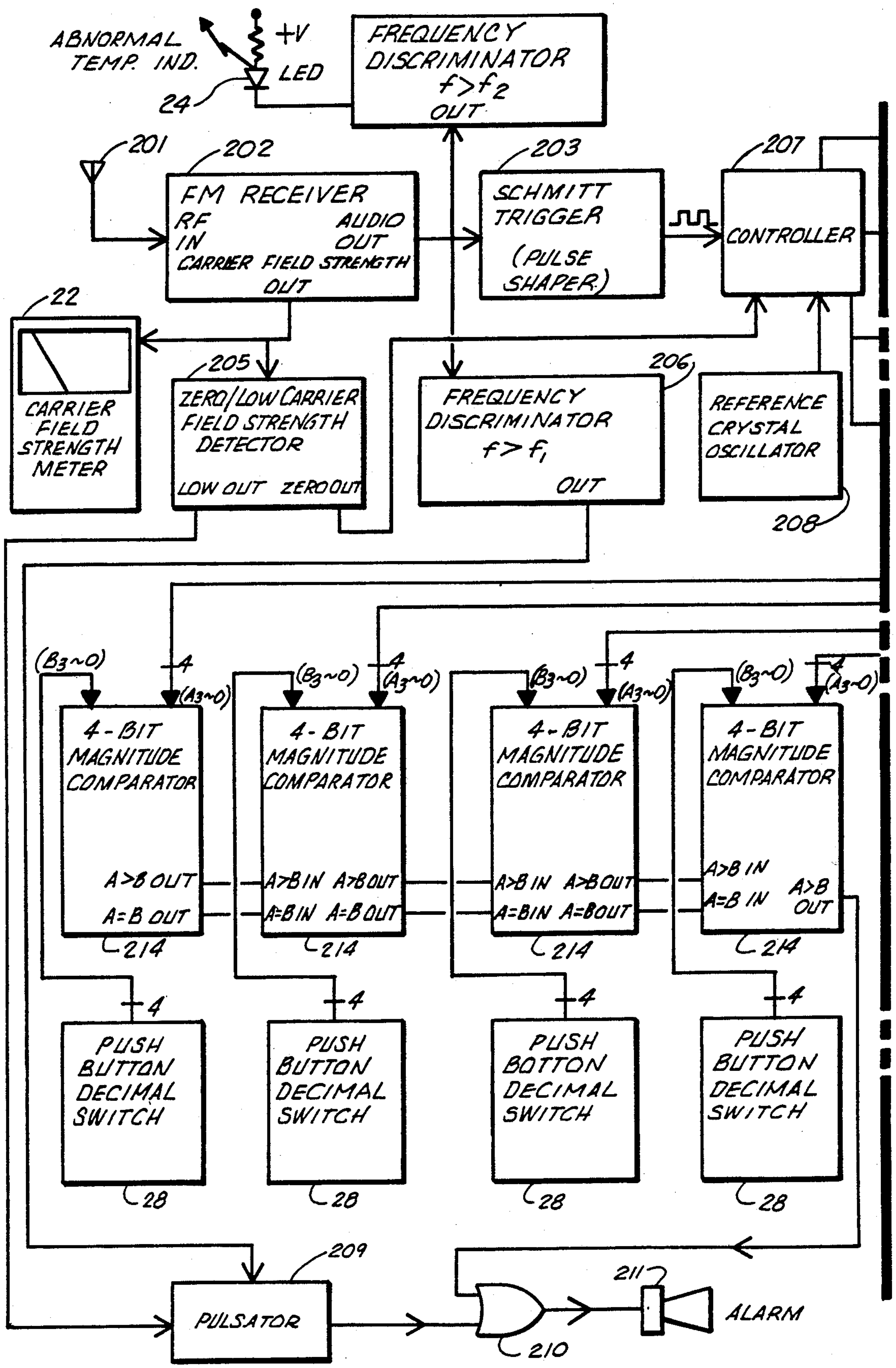
FIG. 3 is a block diagram of an FM receiver circuit coupled to a conventional seven segment display circuit and a push button decimal switch circuit by means of components unique to the present invention.
Figure 3:
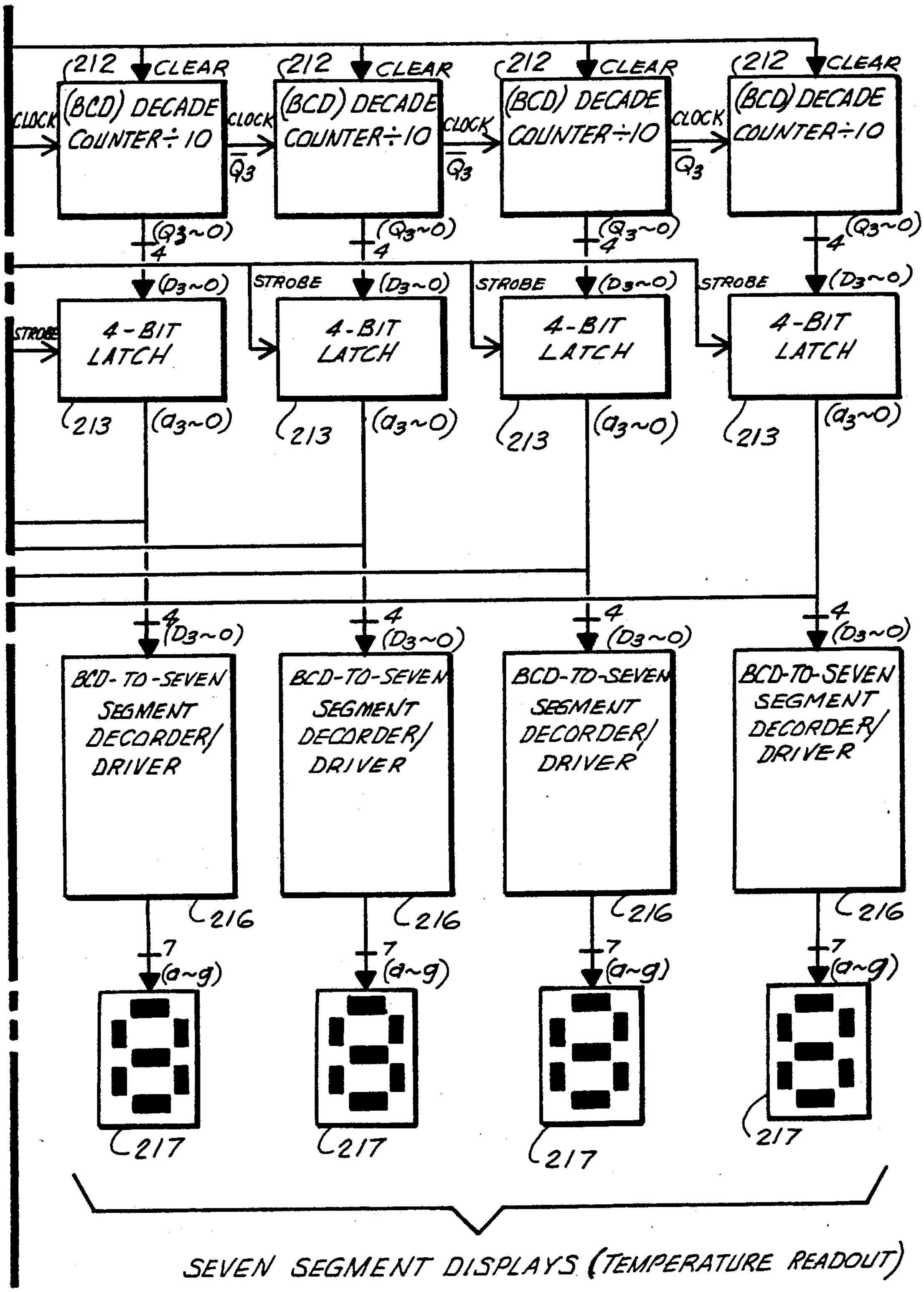

When a signal with the prescribed frequency is detected by antenna 201 FIG. 3, the FM receiver 202 processes the signal for input to the carrier field strength meter 22, field strength detector 205, Schmitt trigger 203 and frequency discriminator 206. The carrier field strength meter 22 provides a visual indication of signal strength, by indicating transmitter battery 18 condition or distance to the transmitter. The field strength detector 205 provides a signal to the pulsator 209 when field strength becomes abnormally low, indicating transmitter battery 18 condition or that the transmitter 12 is out of range of the receiving means 20. However, if no frequency is being received due to transmitter battery 18 failure or the transmitter 12 being in the power down mode, the receiver 202 does not produce a signal to the controller 207, however a signal is being transmitted from the zero-out terminal of field strength detector 205 of the controller 207, telling the controller to display the last signal received. The frequency discriminator 206 provides a signal to the pulsator 209 only when the received signal indicates that a temperature is sensed below the normal body temperature. The Schmitt trigger is a pulse shaper for the signal supplied to controlled 207, converting from an analog signal to a digital signal to be used by the decade counters 212, 4-bit latch 213, seven segment decoder/drivers 216, seven segment displays 217 and the magnitude comparators 214. Controller 207 comprises two parts, a control signal generator and a gate unit it is also responsible for turning on the abnormal temperature indication signal. The control signal generator portion of controller 207 receives signals supplied by reference crystal oscillator 208. The control signal generator portion of controller 207 provides a signal for clearing the counters 212, before each new signal is received and passed to the counters. The control signal generator portion of the controller 207 is responsible for latching new counts representing update temperature readouts into the latches 213. When the gate unit portion of controller 207 is on, the pulses received from Schmitt trigger 203 is allowed to pass to the counter section 212. An LED 24 is provided as a visual indication of abnormal high body temperature regardless of Decimal Switch 28 settings. The magnitude comparators 214 and their selection button decimal switches 28 allows a temperature selection point, at which an alarm signal will be fed through OR gate 210, to an audible alarm 30. Signals fed to pulsator 209 are also fed through OR gate 210 to audible alarm 30.

As mentioned above, the present invention is made feasible and accomplishes the intended use by employing the described power conservation circuitry. The ability of the present invention to monitor a child's body temperature from a wireless remote station, and provide visual and audible alarms at selectable temperatures makes the present invention desirable as depicted. However, numerous modifications and variations of the invention are possible in light of the above teachings and therefore the invention may be practiced otherwise than as particularly described.

What is claimed is:

1. An internal body temperature sensing system comprising:

a) a temperature sensing pacifier having a pull ring on a face of a flange, for sensing a baby's internal body temperature;

b) a radio receiver/transmitting means positioned on said flange face of said pacifier, for receiving and converting a sensed temperature signal for radio transmission to a remote radio receiving means;

c) at least one replaceable battery means mounted in close proximity to said radio transmitting means, in communication with said radio transmitting means, for powering said radio receiver/transmitter;

d) an antenna embedded in said pacifier pull ring, and connected to said radio transmitting means, for increasing the transmission distance; and e) a remote radio receiving means, for receiving said sensed temperature signal.

2. The internal body temperature sensing system as in claim 1, wherein said transmitting means further includes a means for conserving power when said temperature drops below normal body temperature.

3. The internal body temperature sensing system as in claim 1 wherein said transmitting means only transmits said temperature signal when said temperature signal exceeds normal body temperature.

4. The internal body temperature sensing system as in claim 1 wherein said transmitting means produces a unique signal designated specifically for body temperature.

5. The internal body temperature sensing system as in claim 1 wherein said transmitting means is provided with a test means for allowing the user to test said transmitter from said remote receiving means.

6. The internal body temperature as in claim 1 wherein said receiving means, provides a visual temperature display abnormal temperature visual and audible alarms, and a temperature alarm point setting means.

7. The internal body temperature sensing system as in claim 1 wherein said radio receiving means further comprises a field strength detector that discriminates between low signal strength and no signal received.

8. The internal body temperature sensing system as in claim 1 wherein said radio receiver further comprises a distinguishable audible alarm indicative of low signal strength.

9. The internal body temperature sensing system as in claim 1 wherein said radio receiver further comprises as means for said field strength detector to cancel said audible alarm when no signal is detected.

10. The internal body temperature sensing system as in claim 1 wherein said radio receiver further comprises a frequency discriminator that activates a distinguishable audible alarm when a frequency indicating lower than normal body temperature is detected.

11. The internal body temperature sensing system as in claim 1 wherein said radio receiving means includes a pulse shaper which converts an analog signal to a digital wave form.

12. The internal body temperature sensing system as in claim 1 wherein said visual temperature display includes a seven segment digital display.

13. An internal body temperature sensing system as in claim 12 wherein said alarm point setting means includes a magnitude comparator and push button assembly.

14. The internal body temperature sensing system as in claim 1 wherein said radio receiving means includes a visual illuminating means indicative of any abnormal temperature above normal body temperature regardless of temperature point setting.

* * * * *